United States Patent [19]

Tolini et al.

[11] 3,795,371

[45] Mar. 5, 1974

[54] AUTOMATIC THREADING TAPE DRIVE

[75] Inventors: Charles Tolini, Brockton; William Hobart, Whitinsville, both of Mass.

[73] Assignee: Honeywell Inc., Minneapolis, Minn.

[22] Filed: Apr. 20, 1970

[21] Appl. No.: 29,935

[52] U.S. Cl. ...................... 242/182, 15/100, 226/91, 242/186

[51] Int. Cl. ....................... G11b 15/66, G11b 15/58

[58] Field of Search ... 242/182, 183, 184, 185, 186, 242/188, 189, 201, 202, 203, 210; 352/157, 158; 226/91, 95, 92, 97, 118; 15/308, 100; 274/47

[56] References Cited

UNITED STATES PATENTS

| | | | |
|---|---|---|---|
| 3,059,266 | 10/1962 | Cleveland | 15/308 |
| 3,254,854 | 6/1966 | Deighton et al. | 242/182 X |
| 3,628,749 | 12/1971 | Ort et al. | 242/197 |
| 3,643,889 | 2/1972 | Krause | 242/186 X |
| 3,643,890 | 2/1972 | Milligan et al. | 242/182 |
| 2,815,907 | 12/1957 | McCormick | 242/188 |
| 3,393,878 | 7/1968 | Aweida et al. | 242/182 |
| 2,891,736 | 6/1959 | Blaes | 242/192 |
| 3,127,120 | 3/1964 | Selsted et al. | 242/188 |

*Primary Examiner*—George F. Mautz
*Attorney, Agent, or Firm*—Nicholas Prasinos; Ronald T. Reiling

[57] ABSTRACT

An electro-pneumatic automatic tape threading apparatus in combination with a tape handling machine is disclosed. An electro-pneumatic sensing means senses the position of the tip-of-tape relative to a threading guide and when properly positioned, the tape is propelled, assisted by air jets, through a threading guide, past a magnetic head, onto a rotating tape take-up reel provided with vacuum holding means for attracting and holding the tape. Tape take-up sensing means provide electro-pneumatic control signals when the tape successfully threads and is picked up by the tape take-up reel which informs the system to reverse the tape take-up reel, apply the tape brake, and apply vacuum into the loop chambers drawing slack tape into left and right loop chambers respectively.

4 Claims, 3 Drawing Figures

INVENTORS
CHARLES TOLINI
WILLIAM HOBART
BY Nicholas Prasinos
ATTORNEY

INVENTORS
CHARLES TOLINI
WILLIAM HOBART
BY Nicholas Prasinos
ATTORNEY

INVENTORS
CHARLES TOLINI
WILLIAM HOBART
BY
Nicholas Prasinos
ATTORNEY

AUTOMATIC THREADING TAPE DRIVE

BACKGROUND OF THE INVENTION

The present invention is directed to a novel automatically threading tape drive utilizing electro-pneumatic means.

More particularly, the present invention is directed to a novel electro-pneumatic means which detects the end of a magnetic tape which is rotating freely on a supply reel and which when sensed by pneumatic means initiates a series of operations which propel it through a threading guide past a magnetic head and onto a tape take-up reel.

The present invention is further directed to an improved electro-pneumatic tape pick-up sensor which senses the arrival of the tape onto the take-up reel and initiates a series of operations which loads the proper amount of tape into tape loop chambers.

In most modern digital tape drive systems having an open supply reel and an open take-up reel (i.e., not encased in the cartridge) on spaced parallel axis, and with tape-head means intermediate between said supply reel and take-up reel, and also having a pair of slack tape vacuum loop chambers generally on the opposite side on each of the tape-head means, and threading guide means, the tip of the tape has to be guided manually and aligned with the beginning of the threading guide means before threading can begin. Other prior art devices require the tape-reel to be enclosed in a cartridge which has inlet means to provide air under pressure to the cartridge interior which peels the free end of tape from the reel in the cartridge as it is rotated and feeds the free end into the tape transport threading guide. The cartridge in this system forms an additional appertunance to make the system complete; whereas without the cartridge as hereinbefore described the system is semi-automatic requiring manual introduction into the tape threading path. It is therefore an object of this invention to provide an automatically threading tape drive for tape reels with or without a cartridge.

SUMMARY OF THE INVENTION

This invention provides a novel apparatus for use with a tape handling machine comprising, generally, a pair of spaced hubs the first of said hubs adapted to receive a tape supply reel and the second of said hubs adapted to receive a tape take-up reel and rotatably mounted thereon, tape-head means mounted intermediate between said tape supply reel and tape take-up reel, thread guiding means interposed on either side of said tape-head means for guiding said tape from said supply reel to said tape take-up reel past said tape-head means, and a pair of slack tape loop-chambers disposed adjacent and below each of said reels. The free end of the tape peels away from a rotating supply reel assisted by air jets and is sensed by a tip-of-tape sensing means which positions the end of tape so that it is in alignment with the threading guide means at the beginning of the threading path, whereupon said sensing means initiates a sequence of steps which propel said tape through the thread guiding means past tape-head means and onto a tape take-up reel provided with vacuum means to attract and hold the end of tape. When sufficient tape is wound on the take-up reel the system is automatically stopped, the take-up reel reversed, the supply reel driven clockwise while a tape brake intermediate between said reels is applied, and a vacuum is further applied to tape loop chambers which draws a prescribed amount of slack tape into said chambers.

One feature of the invention is to provide means for determining whether or not the automatic tape threading operation has been successful, and if unsuccessful to repeat the procedure.

Another feature of the invention is an improved tape take-up sensor which senses and controls adequate tape wind-up on the take-up reel and initiates operations to automatically load the tape loop chambers.

Still another feature of the present invention is the automatic unload when the drive is put into the unload mode. An end of tape sensor is activated which senses the end of the tape in its unload operation and shuts the drive down.

BRIEF DESCRIPTION OF THE DRAWINGS

Other features and advantages of the invention will become apparent from the following description and claims and in the accompanying drawings which disclose the principles of the invention and the best mode which has been contemplated in utilzing these principles.

DETAILED DESCRIPTION OF THE PREFERRED EMBODIMENT

Figure 1:
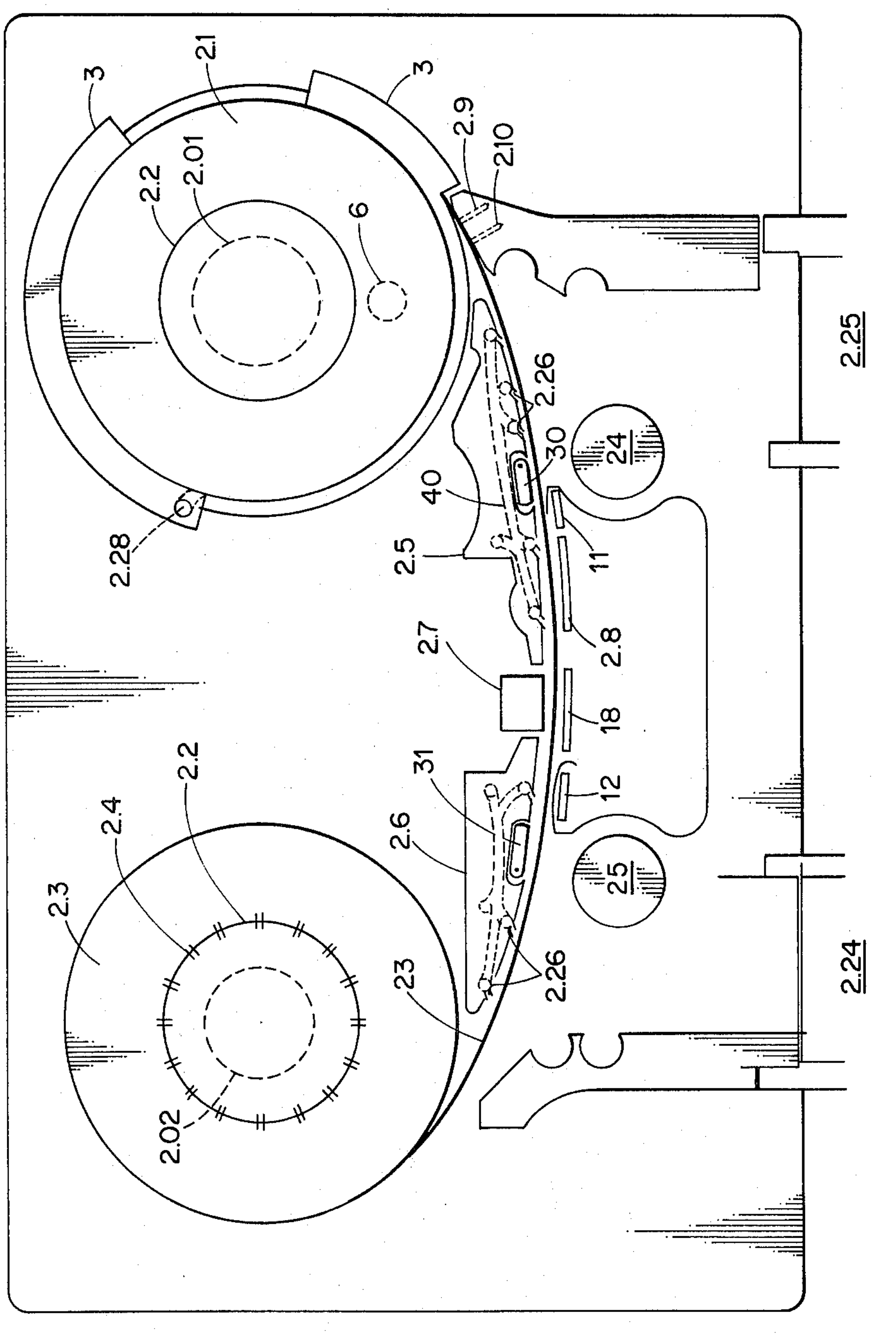
FIG. 1 is a side elevation view of the automatic threading means as used with a reel not enclosed by a cartridge.

In FIG. 1, a guard ring 3 is mounted on the frame of the machine (not shown), with the upper portion of the guard ring having peel jet orifice 2.28 located on the inner periphery of the guard ring, which is supplied with air under pressure and is utilized to assist in separating the end of the tape as the supply reel 2.1 is rotating counter-clockwise. Tape supply reel 2.1 is rotatably mounted on a hub 2.2 of a type disclosed in patent application of Allan C. Wainio in copending application Ser. No. 29,937 filed on Apr. 20, 1970, now U.S. Pat. No. 3,690,581 and assigned to the same assignee as the instant application. A reel position sense switch 6 electrically senses when supply reel 2.1 is in position and locked on the hub 2.2. A tip-of-tape sense hole or port 2.9 communicating with vacuum means (not shown in FIG. 1) is disposed below the tape supply reel 2.1 and in the path of the free end of the tape. The tip-of-tape sense hole 2.9 pneumatically senses the presence of the tape by a change of pressure from atmosphere to vacuum and initiates a cycle (later to be described in detail) which threads the tape through a path formed by a right threading guide 2.5, a magnetic head 2.7 and a left threading guide 2.6, all located on one side of the tape; and a right capstan 24, a right tape guide 11, a tape brake 2.7, a head sink 18, a left tape guide 12, and a left capstan 25, all located on the opposite face of the threaded tape 23. (Tape 23 is shown in a threaded mode to identify the threading path.) Right and left threading guides 2.5 and 2.6 respectively are disposed on opposite sides of the magnetic head 2.7 and are provided with a multiplicity of air slots 2.26 operative to direct air under pressure on the upper face of the tape in a direction toward a take-up reel 2.3. Any suitable source of air under pressure may be connected to the air slots 2.26 through conduit means 40 internally located in the threading guides and communicating to an air pressure source 2.19 shown on FIG. 2. Right and left tape cleaners 30 and 31 respectively are located in openings in the threading guide and are rotatably mounted for rotation into or out of the tape threading path. These tape cleaners 30 and 31 described in detail in a copending application Ser. No. 29,936 filed on Apr. 20, 1970, now U.S. Pat. No. 3,683,445 and assigned to the same assignee as the instant invention, are positioned and locked essentially as shown in FIG. 1 out of the path of the tape 23 while the threading operations are in progress. A magnetic head 2.7 disposed between right and left threading guides 2.5 and 2.6 respectively performs the function of selectively reading and writing information on the tape as required after the threading operation has been completed, slack tape has been taken up into the vacuum chambers, and the tape drive has been turned over to the computer program. A head sink 18 has a main function of preventing cross-talk when reading and writing information but it also has a secondary function peculiar to the automatic threading function and that is to act as a guide to keep the tape 23 on its course and to also prevent undue flutter of the tape. It performs this function by being placed in a positon sufficiently separated from magnetic head 2.7 to provide sufficient clearance for the tape to thread between it and magnetic head 2.7. Upon completion of its threading operation, it is moved, by means not shown closer to the tape 23. Tape brake 2.8 is disposed below the right threading guide 2.5 and in spaced face-to-face relationship therewith for permitting tape to pass thereinbetween. Upon the activation of a tape brake solenoid 3.18 on FIG. 2 vacuum is applied to tape brake 2.8 via conduit means 2.551 shown on FIG. 2 which causes downward movement of the tape causing the tape to drag on the brake surface and cooperates therewith to restrain the motion of the tape. Right and left tape guides 11 and 12 respectively located below, right and left threading guides respectively on either side of the magnetic head 2.7 serve to guide and align the tape underneath the magnetic head 2.7 for proper reading and writing during normal operation, and are in an open mode during threading operations. Right and left capstan drives 24 and 25 respectively are disposed above right and left tape loop chambers 2.25 and 2.24 respectively for driving the tape (after the completion of the threading operations) in either direction, as desired, past the magnetic head and into or out of loop chambers. The tape loop chambers 2.25 and 2.24 are substantially identical and consist of a generally rectangular cross-section and are approximately equal to the width of the magnetic tape. Thus, on the application of a vacuum to the loop chambers, the tape drops into either loop chamber when sufficient slack tape covers its entrance and a loop, not shown, is formed wherein the tape serves to divide the loop chamber into two separate segments, with that portion of the segment above the loop chamber open to the atmosphere, whereas that portion of the loop chamber below the loop subjected to a vacuum by means to be later described. Tape take-up reel generally denoted 2.3 may be similar to that disclosed in FIGS. 3 and 4 of U.S. Pat. No. 3,393,878 issued July 23, 1968. Generally, take-up reel 2.3 is provided with aperture means 2.4 on the surface of the smaller diameter hub of take-up reel 2.3 extending for a width equal to the tape width and disposed to attract the tape to its surface when the tape has successfully threaded and vacuum is supplied to said aperture through conduit 2.551 and vacuum source 2.17 shown on FIG. 2. Both tape supply reel and tape take-up reel are driven by reel motors 2.01 and 2.02 in FIG. 1 capable of forward or reverse rotation. The point of signal application for driving the reel motors 2.01 and 2.02 clockwise or counterclockwise and the means for accomplishing this are described in copending application of George Proulx Ser. No. 29,938 filed on Apr. 20, 1970, now U.S. Pat. No. 3,701,494 and assigned to the same assignee of the instant invention. The end of tape sense hole 2.10 disposed in the path of travel of the tape and laterally removed from tip-of-tape sense hole 2.9 senses the end of tape when the system has been placed in an unload mode and the tape is being unwound from the apparatus and initiates the operations to stop the system.

Figure 2:
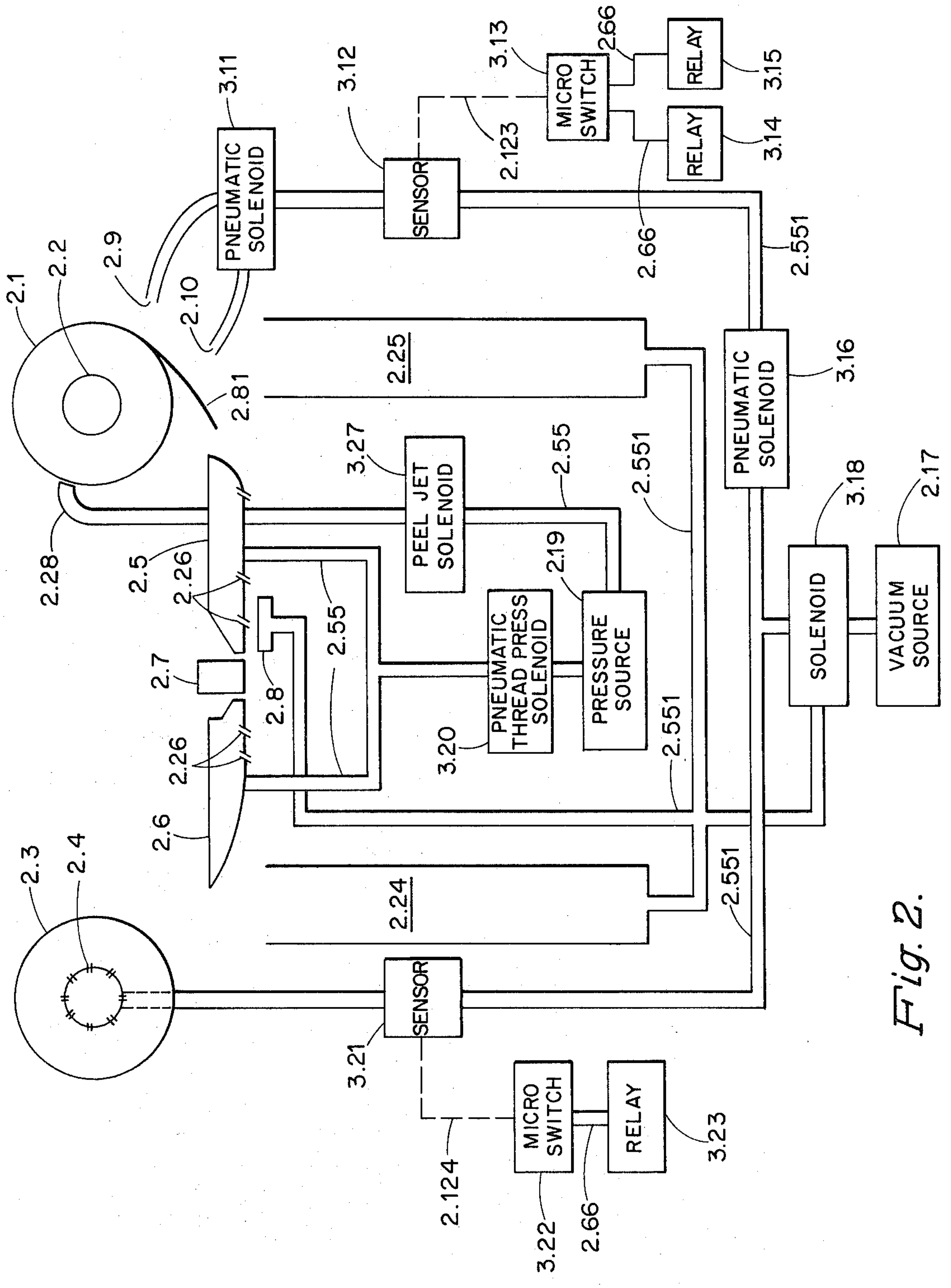
FIG. 2 is a block schematic representation of the invention.

FIG. 2 is a schematic illustration of an embodiment of the invention. In order to facilitate the understanding of the interrelationship of the various elements and the operation of the invention, the operations have been divided in cycles, but it is to be understood that the elements cooperate and function in a continuous discrete manner to achieve the result desired.

CYCLE 1–TIP-OF-TAPE SENSE. (REFERENCE FIG. 2)

In response to a manual start switch (not shown) the tape supply reel 2.1 begins to rotate in a counter-clockwise direction while the tape take-up reel 2.3 is rotating in a clockwise direction. Peel jet solenoid 3.27 commercially available for organizations such as Honeywell Inc. is energized supplying pressure to peel jet 2.28 from a pressure source 2.19 through conduit means 2.55. As the supply reel 2.1 continues to rotate counter-clockwise peel jet 2.28 is blowing air down on to the reel of tape on the supply reel and forces the tip-of-tape 2.81 away from the reel. The supply reel continues to rotate in the counter-clockwise direction so that the tip of the tape comes into position near the tip-of-tape sense hole 2.9. Since the tip-of-tape sense hole has vacuum supplied to it from vacuum source 2.17 through conduit means 2.551, and pneumatic solenoids 3.11 and 3.16 are in the open mode, its presence is detected by a pneumatic sensor 3.12 commercially available from Honeywell Inc. The sensor 3.12 is a pneumatic solenoid operative to distinguish between atmosphere and a vacuum so that when the sense hole 2.9 is open to the atmosphere the sensor 3.12 is inactive but when the tape covers the sense hole 2.9, the sensor 3.12 is activated. The pneumatic sensor 3.12 is pneumatically coupled to conduit 2.551 and mechanically coupled through coupling means 2.123 to a micro-switch 3.13, which is actuated to a NO (normally open) position and energizes a relay 3.15. (At this point in time, the tape has been positioned in alignment with the right-hand threading guide 2.5 on FIG. 2 and that information has been made known to the system). At this point in time, the condition of the system is as follows:

a. pneumatic solenoid 3.16 has been energized providing vacuum to tip-of-tape sense hole 2.9;
b. relay 3.15 has been energized informing the system that tape has been sensed and is approaching position for threading in so far as the tip-of-tape is near the sense hole 2.9;

c. pneumatic thread pressure solenoid 3.20 is deenergized, hence, no air is being supplied to the air slots 2.26;
d. solenoid 3.18 is in a deenergized condition, hence, the tape brake 2.8 is off and the vacuum to the tape loop chambers 2.24 and 2.25 respectively is off;
e. solenoid 3.18 is deenergized supplying vacuum to apertures 2.4 of tape take-up reel 2.3 and solenoid 3.16.

CYCLE 2 — BEGIN THREADING OPERATION

As the tip-of-tape 2.81 passes by the tip-of-tape sense hole 2.9, the tip-of-tape sense hole is again exposed to atmosphere. Once again, the pneumatic sensor 3.12 is released and a second relay 3.14 is energized as micro-switch 3.13 goes back to the NC (normally closed) position. (Relay 3.14 cannot be energized unless relay 3.15 is energized, see FIG. 3 and later discussion for details.) At this point in time, the tape 2.81 has been positioned in alignment with right threading guide 2.5 and is ready to begin threading. When relay 3.14 is energized, it provides electric signals to:

a. reverse rotation of the supply reel 2.1 so that it begins travelling in a clockwise direction;
b. deenergize solenoid 3.16, thus cutting off the vacuum to tip-of-tape sense hole 2.9;
c. energize thread pressure solenoid 3.20 thus supplying air pressure to air slots 2.26 from pressure source 2.19 via conduits 2.55;
d. deenergize peel jet solenoid 3.27 removing pressure from peel jet;
e. initiates a timing cycle of 6 seconds (if after 1.5 seconds, the tape take-up sensor 3.21 has not sensed that the tape has threaded through to the take-up reel 2.3, the timing cycle is discontinued and the system is stopped).

At this point in time, the condition of the system is as follows:

a. relays 3.15 and 3.14 have been energized;
b. the rotation of the supply reel 2.1 is now in the same direction as the tape take-up reel 2.3, or in a clockwise direction;
c. solenoid 3.20 is energized thus air pressure is supplied to air slots 2.26.

CYCLE 3 — THREAD TAPE THROUGH THREAD GUIDE PATH AND ONTO TAPE TAKE-UP REEL

The tip-of-tape 2.81 is driven forward toward the take-up reel 2.3 by the clockwise motion of reel 2.1 and into the threading path and is picked up by the air stream flowing through apertures 2.26 in the threading guides. The air from the apertures 2.26 serves two functions: first, it supports the weight of the tape and thereby keeps the tape close to the surface of the threading guides 2.5 and 2.6 respectively, a vacuum having been created by the flow of such air in accordance with the Bernoulli or Venturi principle; and secondly, the air assists in projecting the tape from the tape supply reel 2.1 to the tape take-up reel 2.3. As the tip of the tape comes into the area of the tape take-up reel 2.3, it is drawn onto the tape take-up by vacuum supplied to the apertures 2.4 from vacuum source 2.17 through conduits 2.551. When the take-up reel 2.3 has approximately three quarters of its smaller circumference covered by tape, then tape take-up sensor 3.21, a solenoid similar to solenoid 3.12 previously described, is engaged, mechanically actuating microswitch 3.22 through mechanical linkage means 2.124 and energizes relay 3.23 and provides electric signals to:

a. remove drive from supply reel 2.1;
b. permits the timing cycle previously commenced to continue for the full 6 seconds.

If the tape fails to thread successfully, as has been previously mentioned, pneumatic tape take-up sensor 3.21 is not energized and at the end of 1.5 seconds of the 6 second timing cycle earlier initiated, the operation of the system is stopped and must be reset manually to start another threading cycle.

Upon successful threading, however, the condition of the system is as follows:

a. relay 3.15 is deenergized and relay 3.14 is energized;
b. drive has been removed from the tape supply reel 2.1 and pneumatic thread pressure solenoid 3.20 is deenergized;
c. relay 3.23 is deenergized;
d. solenoid 3.18 is deenergized.

CYCLE 4 — LOADING LOOP CHAMBERS

The take-up reel 2.3 continues to run for the expiration of the six second timing cycle and pulls off tape from the supply reel and continues to do so until sufficient tape has been taken up onto the take-up reel 2.3. At the expiration of the six second timing cycle the following things happen simultaneously; (details to be later described in connection with FIG. 3):

a. tape take-up reel 2.3 reverses direction so that it is rotating counter-clockwise;
b. tape supply reel 2.1 starts to drive again in a clockwise direction;
c. pneumatic solenoid 3.18 is energized which actuates tape brake 2.8, and also applies vacuum to tape loop chambers 2.24 and 2.25 from vacuum source 2.17 through conduits 2.551, urging the slack tape into chambers 2.24 and 2.25.

Pneumatic sensors (not shown) sense that the tape has dropped into the loop chambers and the threading is complete and the movement of tape is then turned over to the operating system. (This operation is described in copending application of George Proulx, Ser. No. 29,938 filed Apr. 20, 1970, now U.S. Pat. No. 3,701,494 and assigned to the same assignee as the instant application.)

Figure 3:
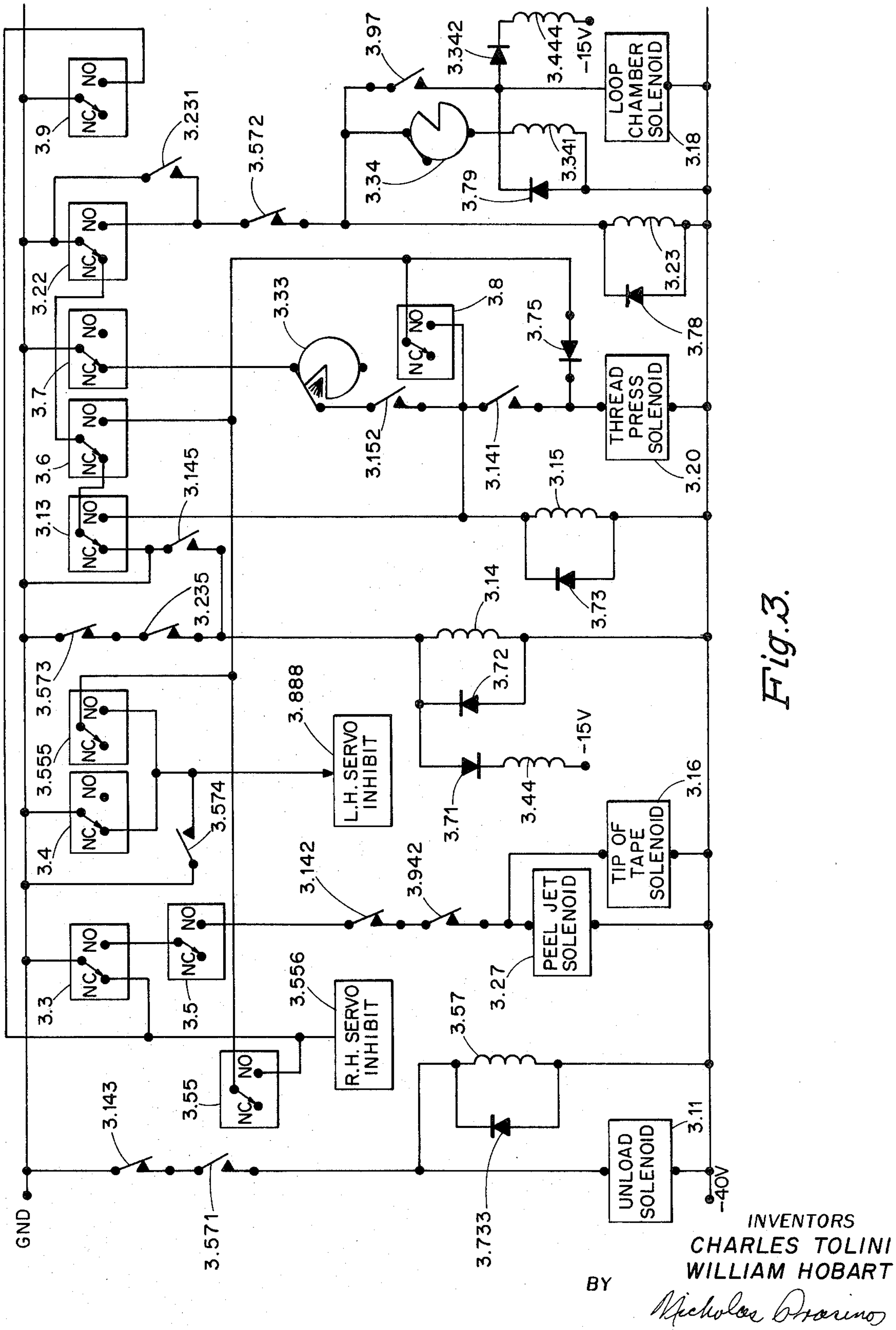
FIG. 3 is a schematic circuit diagram of the control relay logic of the invention.

FIG. 3 is an illustration of a novel arrangement of commercially available solenoids, relays, cam switches, microswitches and diodes into a relay logic system which provides control for the apparatus and the system heretofore described. For the sake of clarity cycles will be used here representing the same points in time as the cycles in the prior discussion with the exception of the precycle conditions.

PRECYCLE CONDITIONS. (REFERENCE FIGS. 2 AND 3)

Prior to commencing the automatic threading operation there must be sufficient vacuum available to the take-up reel vacuum apertures 2.4, and to the sensing means 2.9; and there must also be sufficient pressure available to the apertures 2.26. One part of the system coupled to the vacuum source 2.17 requires at least a vacuum of 48 centimeters of water at the vacuum source 2.17, and another part coupled to the pressure source 2.19 requires at least 2 lbs./in. pressure at the pressure source 2.19.

Without the presence of these conditions automatic threading would fail and possibly damage the tape. Thus, microswitches 3.3 and 3.4 are vacuum actuated and when vacuum is below 48 centimeters of water, they are in the normally closed position, supplying ground to the right hand servo inhibit 3.556 and left hand serveo inhibit 3.888 respectively, preventing motion of the right and left hand reels 2.1 and 2.3 respectively. When the vacuum source 2.17 has reached at least 48 centimeters of water, microswitches 3.3 and 3.4 are actuated to the normally open position removing ground from right and left hand servo inhibit 3.556 and 3.888 respectively and permitting right and left hand reels 2.1 and 2.3 respectively to rotate on the application of proper voltage signal to the reel drive motors 2.01 and 2.02 on FIG. 1. Microswitch 3.5 through diaphragm and linkage means (not shown) is coupled to the pressure source 2.19, FIG. 2, and insures that pressure for apertures 2.26 is above a minimum of 2 pounds per square inch before threading. When pressure is below the critical point, switch 3.5 is in the normally closed position and does not supply ground to the tip-of-tape solenoid 3.16. However, when the pressure in the pressure-source 2.19 is above the critical point, microswitch 3.5 shifts to the normally open condition supplying ground through now normally open microswitch 3.3 and through normally closed contacts 3.142 and normally closed contacts 3.942 to the tip-of-tape solenoid 3.16; thus activating the solenoid 3.16 and supplying vacuum to the tip-of-tape sensor 2.9 and thus placing the system in condition to start cycle 1.

CYCLE 1 — TIP-OF-TAPE SENSE

As mentioned previously, microswitch 3.13 is deenergized in the normally closed (NC) position when pneumatic sensing solenoid 3.12 is exposed to atmospheric pressure and is energized normally open (NO) position when pneumatic sensing solenoid 3.12 is exposed to vacuum. Therefore, when the tape does not cover sense hole 2.9 thus leaving microswitch 3.13 under the influence of atmospheric pressure, microswitch 3.13 is in the normally closed position, hence, neither relays 3.15 nor 3.14 are activated since their circuit is not complete to ground. However, as tape passes over sense hole 2.9 microswitch 3.13 flips to the normally open position as previously described thus energizing relay 3.15. Relay 3.15 controls two normally open contacts 3.152 and 3.145. When relay 3.15 is energized, these contacts close and are kept in an energized state through cam switch 3.33. At this point in time, the timing cycle has not started yet. As the tip-of-tape goes by sense hole 2.9, microswitch 3.13 is now exposed to the influence of atmospheric pressure through pneumatic sensor 3.12 on FIG. 2 and reverts to the normally closed condition. However, at this point in time, relay contacts 3.145 are in the closed position and being held in this position by cam switch 3.33 and thus relay 3.14 is now energized by providing ground to relay 3.14 through now closed contacts 3.145. Thus, it is seen, FIG. 2, that relay 3.15 is interlocked with relay 3.14 so that relay 3.14 cannot be activated until relay 3.15 has been activated. This series of steps has placed the system in a position ready for threading.

CYCLE 2 — BEGIN THREADING OPERATION

Relay 3.14 controls normally closed contacts 3.142 and normally open contact 3.141 and cam switch 3.34, and also starts a timing motor of cam switch 3.33 starting a 6 second timing interval. Consequently, when relay 3.14 is activated, the following events take place:

a. cam switches 3.33 and 3.34 start their timing cycle;
b. normally closed contacts 3.142 are open removing ground from tip-of-tape solenoid 3.16 which shuts off vacuum to tip-of-tape sense hole 2.9; it also removes ground from peel jet solenoid 3.27 eliminating air pressure to peel jet 2.28;
c. relay contacts 3.141 are closed supplying ground to thread pressure solenoid 3.20 through now closed contact 3.152, cam switch 3.33 and NC microswitch 3.7 and energizing solenoid 3.20 supplying pressure for air flow through apertures 2.26 in threading guides 2.5 and 2.6 respectively;
d. ground is also supplied to right hand drive servo 3.44 which provides a positive 15 volt signal to right hand reel drive motor 2.01 on FIG. 1 through means described in previously mentioned copending application of George Proulx, driving the right hand reel clockwise. The right hand reel drive-servo 3.44 is coupled to the relay logic system through a diode 3.71 biased so as to prevent spurious signals from right hand reel drive-servo 3.44 from giving a false signal to relay 3.14 and falsely energizing it, but permitting electric signals to right hand drive servo 3.44 to pass.

CYCLE 3 — THREAD TAPE THROUGH GUIDE AND ONTO TAKE-UP REEL

The tape is now propelled through its threading path onto take-up reel 2.3 whereupon it is sensed by solenoid 3.21 which is pneumatically coupled to aperture 2.4 for responding to air pressure or vacuum, and mechanically coupled to microswitches 3.22 and 3.9. Microswitches 3.22 and 3.9 are activated to the normally open positions, microswitch 3.22 supplying ground to relay 3.23 and microswitch 3.9 supplying ground to the right hand servo, allowing the right hand reel to free run. When relay 3.23 is energized, it closes normally open contact 3.231 thus maintaining ground on relay 3.23 and latching it on, by bypassing microswitch 3.22. When relay contact 3.235 is closed, it supplies ground to relay 3.14 through normally closed contacts 3.573 thus latching relay 3.14 on, removing the influence of timing cam switch 3.33 from the system and allowing the system to continue the timing cycle until a total of 6 seconds have elapsed from the start of threading operations thus assuring that the tape will continue to wind on tape take-up reel for the full 6 seconds instead of being interrupted at the 1.5 second level which is controlled by cam switch 3.33 as previously described. When approximately 5.5 seconds have elapsed in the timing sequence, relay 3.341 is energized by cam switch 3.34, closing normally open relay contact 3.97 thus supplying ground to loop chamber solenoid 3.18 through by-passed contacts 3.231 now closed, and through normally closed contacts 3.572, and energizing loop chamber solenoid 3.18, which switches vacuum from the tape take-up reel aperture 2.4 into the left and right tape loop chambers 2.24 and 2.25 respectively; and it simultaneously supplies vacuum to the tape-brake 2.8 which brakes the tape by means of friction on the surface of the tape. At the same time, through diode 3.342 (once again used to prevent spurious signals from left hand drive-servo 3.444 accidentally energizing relay 3.341, ground is supplied to left hand reel drive-servo 3.444 supplying a −15 volt signal to left hand reel drive-motor 2.02 on FIG. 1 driving left hand reel counter-clockwise and releasing microswitch 3.9 allowing the right hand reel to drive CW again. Hence, with left hand reel rotating counter-clockwise, right hand reel rotating clockwise and tape-brake applied, and with vacuum in the loop chambers 2.24 and 2.25 a loop of slack tape is urged into each loop chamber respectively and when a specified position of the tape loop is reached within the loop chamber, the threading is essentially completed and the system turned over to the program on the computer. (See previously mentioned copending application of George Proulx.) If the tape fails to drop into the loop chambers, a check relay, not shown, is energized which shuts off the reel drive. The reel drives 2.01 and 2.02 in FIG. 1 are mounted and controlled as shown and described in copending application of George Proulx hereinbefore referred to.

Microswitches 3.6, 3.8, 3.555 and 3.55 are manually operated so that when they are manually switched to the normally open position, they by-pass the tip-of-tape sensor 2.9 for manual threading operations. When microswitch 3.8 is switched to the normally open position, it activates thread pressure solenoid 3.20 which supplies air pressure from pressure source 2.19 through conduit 2.55 to apertures 2.26 in threading guides 2.5 and 2.6 respectively, this time used for manual threading operations. Microswitches 3.55 and 3.555 are other manually operative switches which when placed in the normally open position supply ground to right and left hand servo inhibit 3.556 and 3.888 respectively so as to prevent tape-reel motion when the automatic threading system is in the manual operation. Another manually operative microswitch 3.7 is of the spring-loaded push-button type which when activated sets up drives (not shown) ready for loading and resets relay 3.15 to its initial state.

The automatic threading system may also be placed in the automatic unload state which is threading in reverse, by manually turning a tape switch, (not shown), to the type-change condition which deenergizes relay 3.23 and loop chamber solenoid 3.18 so that vacuum is now switched from the loop chamber back onto the take-up relay 3.21. Concurrently, pneumatic solenoids 3.16 and 3.11 are energized so that vacuum is applied to the end of tape sense hole 2.10.

In the unload state, relay 3.57 is energized, closing contact 3.571 which latches relay 3.57 on; opening contact 3.572 which deenergizes relays 3.23 and 3.341 removing vaccum from loop chamber 2.24 and 2.25; opening contact 3.573 which deenergizes relay 3.14 and causes the right hand reel to rotate CCW; and closing relay contact 3.142 to close vacuum supply to the tip-of-tape sense hole 2.9 through solenoid 3.11 which was energized with relay 3.57. Relay contact 3.574 is closed placing ground on the left hand servo inhibit 3.888 which allows the reel-motor 2.02 on FIG. 1 to run free. Since the right hand reel is turning CCW all the tape remaining in the loop chambers is wound onto the supply reel 2.1 and as the end of tape passes over the tip-of-tape sense hole 2.10, the tip-of-tape is sensed as before, and relay 3.14 is energized causing relay contact 3.143 to open, deenergizing relay 3.57 and this time since the drive is in the unload state when relay 3.14 is energized and 3.57 has been energized the drive is powered down.

Diodes 3.72, 3.73, 3.733, 3.78 and 3.79 are placed across relay coils and function so as to suppress any excess spike voltage that result during the energizing and deenergizing of the relay coils.

While in accordance with the provisions of the patent statutes, there have been illustrated and described, the best forms of the invention known, it will be apparent to those skilled in the art that changes can be made in the apparatus described without departing from the spirit of the invention as set forth in the appended claims and that in some cases, certain features of the invention may be used to advantage, or modified, or substituted for, without a corresponding change or substitution in related features.

What is claimed is:

1. An automatic tape threading apparatus for use with a tape handling machine, comprising a pair of spaced hubs, the first of said hubs adapted to receive a tape supply reel and the second of said hubs adapted to receive a tape take-up reel, means for guiding a tape over a prescribed path from the supply reel when it is mounted on said first hub to the tape take-up reel when mounted on said second hub, and wherein said means for guiding said tape comprises a pair of threading guides provided with a plurality of air jets angled such that a component of air flow is directed toward the path of tape movement from said first hub to said second hub and include, an air pressure source, first conduit means connecting said pressure source to said air jets, thread pressure solenoid pneumatically coupled to said first conduit means, said thread pressure solenoid responsive to a first electric signal to open said pressure source to said air jets, means for rotating said first and second hubs in clockwise and counter-clockwise directions to wind or unwind a reel of tape when mounted thereon, sensing means for detecting the presence of an unattached free end of tape on the tape supply reel said sensing means disposed adjacent said first hub and in the path of the free end of tape when wound on the supply reel and when the supply reel is mounted on said hub, reversing means responsive to said sensing means, said reversing means coupled to said means for rotating said first hub to reverse the rotation of said first hub when the supply reel is mounted on said hub for rotation, and the free end of the tape is sensed by said sensing means, whereby the tape free end is thrust into said guiding means, a vacuum source, second conduit means for connecting said vacuum source to said sensing means, a pneumatic sensing solenoid pneumatically coupled to said second conduit means, said pneumatic sensing means for sensing the presence of atmospheric pressure or vacuum in said second conduit means, a first microswitch mechanically coupled to said sensing solenoid for opening or closing in response to pressure or vacuum in said second conduit means, said first microswitch also electrically coupled to said means for rotating said first hub, said first microswitch providing electric signals to said means for rotating said first hub in response to presence of atmospheric pressure or vacuum in said pneumatic sensing solenoid, first and second relay means coupled electrically to each other and to said first microswitch and also coupled electrically to said means for rotating said first hub and cooperatively providing an event-sequenced electric signal to said first means for rotating said first hub to change rotational direction in response to said signal, and wherein said thread pressure solenoid is electrically coupled to said second relay means for providing said first electric signal to said thread pressure solenoid.

2. An automatic tape threading apparatus for use with a tape handling machine comprising:

a pair of spaced hubs, the first of said hubs adapted to receive a tape supply reel and the second of said hubs adapted to receive a tape take-up reel, guide means for guiding a tape over a prescribed path from the supply reel when it is mounted on said first hub to the tape take-up reel when mounted on said second hub, said guide means further comprising a pair of threading guides provided with a plurality of air jets angled such that a component of air flow is directed toward the path of tape movement from said first hub to said second hub, said second hub being provided with vacuum means for bringing a free end of tape advanced from said guide means into driing engagement with said hub, means for rotating said first and second hubs in clockwise and counter-clockwise directions to wind or unwind a reel of tape when mounted thereon, sensing means for detecting the presence of an unattached free end of tape on the tape supply reel, said sensing means fixedly disposed adjacent said first hub and in the path of the free end of tape when wound on the supply reel and when the supply reel is mounted on said hub, reversing means responsive to said sensing means, said reversing means coupled to said means for rotating said first hub to reverse the rotation of said first hub when the supply reel is mounted on said hub for rotation and the free end of tape is sensed by said sensing means, whereby the tape free end is thrust into said guide means, a vacuum source, first conduit means for connecting said vacuum source to said sensing means, second conduit means for pneumatically connecting said vacuum source with said aperture means and including tape take-up sensing means for sensing the free end of tape on said tape take-up reel, a pneumatic sensing solenoid pneumatically coupled to said first conduit means for sensing the presence of atmospheric pressure or vacuum in said first conduit means, a first microswitch mechanically coupled to said sensing solenoid for opening or closing in response to pressure or vacuum in said first conduit, said first microswitch also electrically coupled to said means for rotating said first hub, said first microswitch providing electric signals to said means for rotating said first hub in response to presence of atmospheric pressure or vacuum in said pneumatic sensing solenoid, a second microswitch means mechanically coupled to said tape take-up sensing means for opening or closing in response to atmospheric pressure or vacuum in said second conduit means, said second microswitch also electrically coupled to said means for rotating said second hub, for providing electric signals to said means for rotating said second hub in response to presence of atmospheric pressure or vacuum in said tape take-up sensing means, first and second relay means coupled electrically to each other and to said first microswitch and also coupled electrically to said means for rotating said first hub and cooperatively providing an event-sequenced electric signal to said means for rotating said first hub to change rotational direction in response to said signal, and tape cleaning means rotatably mounted on said pneumatic means for guiding the tape, said tape cleaning means controllably rotating into or out of the tape threading path, cleaning the tape surface when rotated into the path of the tape.

3. An automatic tape threading apparatus as recited in claim 2 including a pair of tape loop chambers disposed on opposite sides of said threading guide means and one each below said first and second hubs and pneumatically coupled to said vacuum source, a tape loop chamber solenoid means pneumatically coupled to said vacuum source means to said tape loop chamber, said tape loop chamber solenoid means also electrically coupled to said second microswitch means, said tape loop chamber solenoid means operable in response to electric signals from said second microswitch to supply vacuum to said tape loop chamber.

4. An automatic tape threading apparatus for use with a tape handling machine comprising a pair of spaced hubs, the first of said hubs adapted to receive a tape supply reel and the second of said hubs adapted to receive a tape take-up reel, said second hub being provided with vacuum means for bringing a free end of tape into driving engagement with said second hub, and wherein said vacuum means comprise a vacuum source, aperture means on the surface of the smaller diameter of the tape take-up reel, and first conduit means for pneumatically connecting said vacuum source with said aperture means and including tape take-up sensing means for sensing the free end of tape on the tape take-up reel, means for guiding a tape over a prescribed path from the supply reel, when it is mounted on said first hub to the tape take-up reel when mounted on said second hub, and wherein said means for guiding said tape comprises a pair of threading guides provided with a plurality of air jets angled such that a component of air flow is directed toward the path of tape movement from said first hub to said second hub, means for rotating said first and second hubs in clockwise and counter-clockwise directions to wind or unwind a reel of tape when mounted therein, first microswitch means mechanically coupled to said tape take-up sensing means for opening or closing in response to atmospheric presure or vacuum in said first conduit means, said first microswitch also electrically coupled to said means for rotating said second hub, and for providing electric signals to said means for rotating said second hub in response to presence of atmospheric pressure or vacuum in said tape take-up sensing means, sensing means responsive to a decrease in pressure for detecting a free end of tape on the supply reel, said sensing means disposed adjacent said first hub and in the path of the free end of tape when wound on the supply reel and when the supply reel is mounted on said first hub, reversing means responsive to said sensing means coupled to said means for rotating said first and second hubs to reverse the rotation of said first hub when the supply reel is mounted on said hub for rotation, and the free end of tape is sensed by said sensing means, whereby the tape free end is thrust into said guiding means, second conduit means for connecting said vacuum source to said sensing means, a pneumatic sensing solenoid coupled to said first conduit means, said pneumatic sensing solenoid for sensing the presence of atmospheric pressure or vacuum in said first conduit means, a second microswitch mechanically coupled to said sensing solenoid for opening or closing in response to pressure or vacuum in said second conduit, said second microswitch also electrically coupled to said means for rotating said first hub, said second microswitch providing electric signals to said means for rotating said first hub in response to presence of atmospheric pressure or vacuum in said pneumatic sensing solenoid, first and second relay means coupled electrically to each other and to said second microswitch and also coupled electrically to said means for rotating said first hub and cooperatively providing an event - sequenced electric signal to said means for rotating said hub to change rotational direction in response to said signal, an air pressure source, third conduit means connecting said pressure source to said air jets, tape loop chambers disposed on opposite sides of said threading guide means and one each below said first and second hubs and pneumatically coupled to said vacuum source, tape loop chamber solenoid means pneumatically coupled to said vacuum source means, said tape loop chamber solenoid means also electrically coupled to said first microswitch means, said tape loop chamber solenoid means operable in response to electric signals from said first microswitch to supply vacuum to said tape loop chamber, and a tape brake disposed in face-to-face relationship below said means for guiding said tape and pneumatically coupled to said vacuum source, said tape brake supplied with vacuum pulling the tape to the brake surface, causing friction between tape and brake surface for braking said tape in response to vacuum in said vacuum source.

* * * * *